Feb. 1, 1955     J. SMISKO     2,700,988
HOSE FITTING
Filed June 27, 1951     2 Sheets-Sheet 1
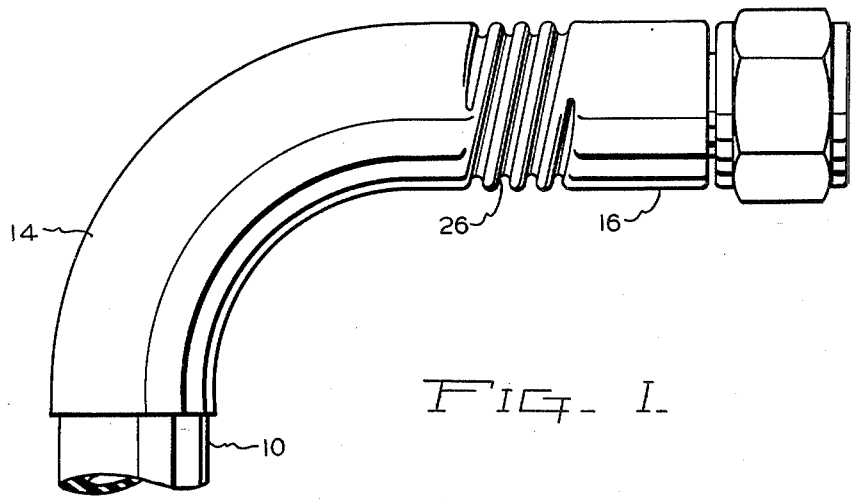
Fig. I.
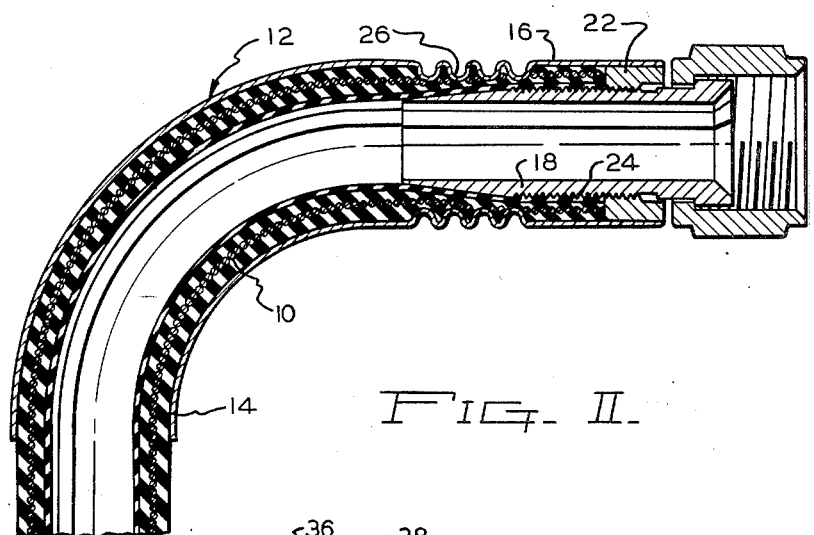
Fig. II.
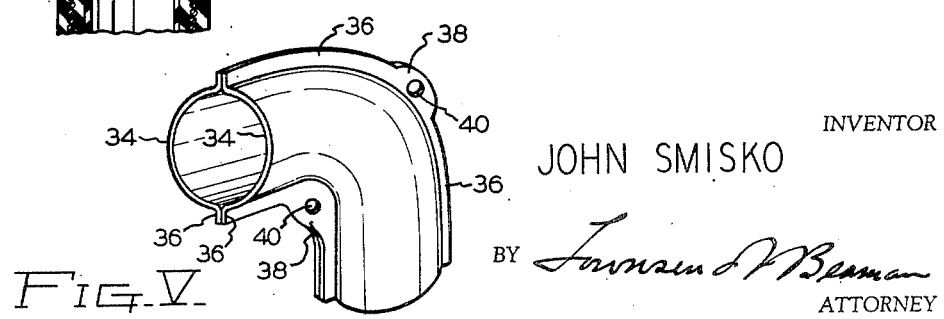
Fig. V.
INVENTOR
JOHN SMISKO
BY *Townsend F. Beaman*
ATTORNEY Feb. 1, 1955   J. SMISKO   2,700,988
HOSE FITTING
Filed June 27, 1951   2 Sheets-Sheet 2
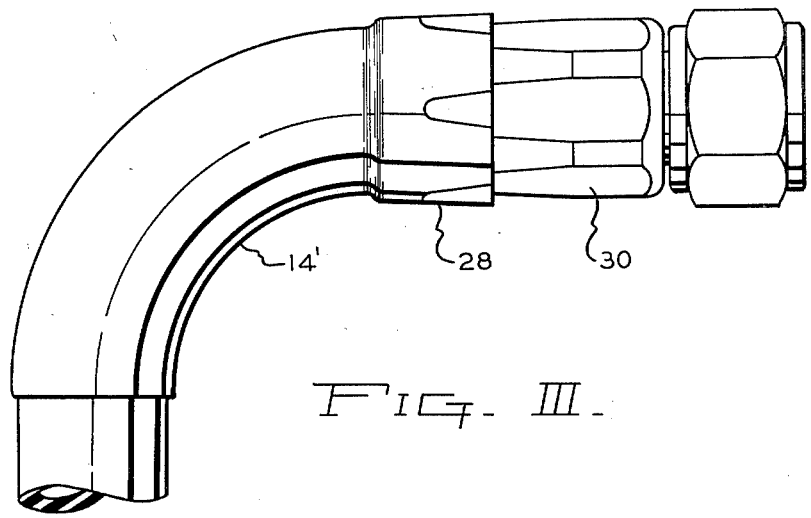
FIG. III.
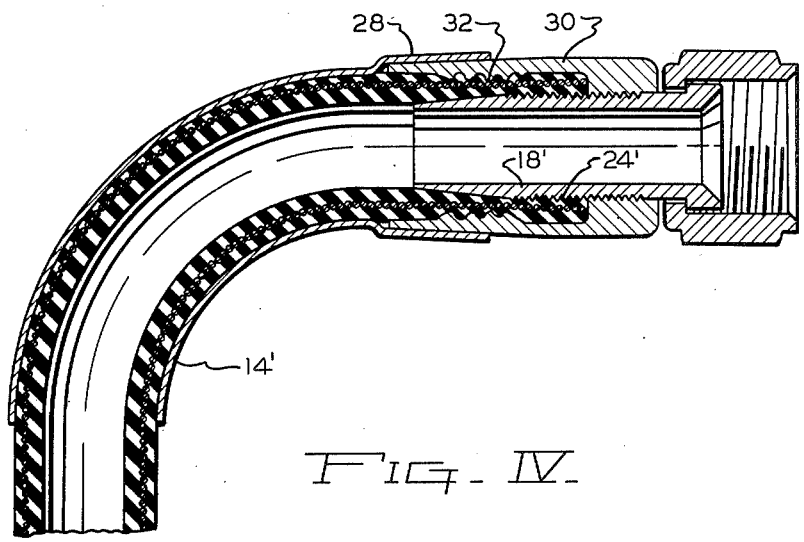
FIG. IV.
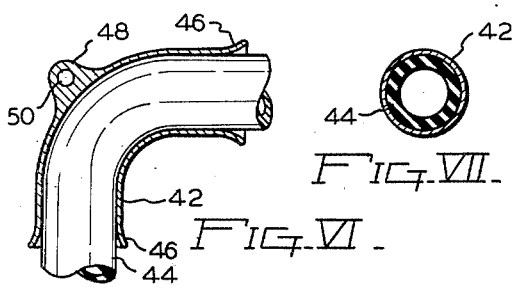
FIG. VII.
FIG. VI.
INVENTOR
JOHN SMISKO
BY *Tournsend Beaman*
ATTORNEY United States Patent Office 2,700,988
Patented Feb. 1, 1955

2,700,988

HOSE FITTING

John Smisko, Jackson, Mich., assignor to Aeroquip Corporation, Jackson, Mich., a corporation of Michigan Application June 27, 1951, Serial No. 233,793

1 Claim. (Cl. 138—25)

This invention relates to flexible hose and fittings and in particular to flexible hose having end fittings in the form of an inner nipple and an outer socket, with a portion of the hose end held firmly gripped between the nipple and the socket.

With the present day extensive use of flexible hose on aircraft, vehicles and machinery generally it is very frequently necessary that the hose should be bent sharply away from its point of connection by the end fitting, or at one or more spaced locations along the hose length, at a radius which is smaller than that which the hose will normally withstand without collapsing.

It is the object of the present invention to provide means whereby flexible hose can be bent sharply, as above stated, without collapsing of the hose.

It is a further object of the invention to provide a combination end fitting and hose protector which enables the hose to be bent beyond its collapsing radius or angle while adaptable for use to attach the other end to a required fixture.

The above and further objects and advantages of the invention will appear clear from consideration of the following description of two practical forms of the invention, by way of example, and with reference to the accompanying drawings, in which:

Fig. I is an elevation of one form of the invention,

Fig. II is a longitudinal section of Fig. I,

Figs III and IV are similar views of a further form of the invention,

Fig. V is a perspective view of an embodiment of the invention suitable for supporting flexible hose in a sharply bent form, without collapsing, intermediate its ends and incorporating affixing brackets, Fig. VI is a longitudinal section of another embodiment of the invention suitable for the purpose described with reference to Fig. V but with the enclosing tube formed in one piece, and Fig. VII is a cross-section of Fig. VI.

Referring to the drawings, in Fig. I and II the flexible hose is indicated at 10 enclosed along its end portion in an enclosing tube 12 preformed into a sharp bend, as shown, which tube holds the hose from collapsing while held upon an end socket and nipple fitting.

The tube 12 has the curved portion 14, and a straight end portion 16 which defines the said socket and co-operates with an internal nipple 18 to form an annular chamber into which the end portion 20 of the hose is secured. This chamber is closed at one end by a collar 22 secured upon the exterior screw-threaded portion 24 of the nipple and having the corresponding end of the tube sweated or otherwise secured thereon. The screw-threading 24 is right-hand and extends into the said annular space for the engagement of the interior surface of the hose therewith, whereas the tube socket portion 16 has left-hand threads 26 rolled thereinto and defining internal grooves into which the hose end portion is forced upon the attachment of the end fitting in known manner.

In Figs. III and IV the tube hose enclosure 12' is separately formed from a section of tubing to define the curved portion 14' and an enlarged end portion 28 which is swaged or otherwise secured upon the exterior of the standard nipple and socket assembly, the nipple being indicated at 18' and the socket at 30, these parts having left and right hand threads, as indicated at 32 and 24', respectively.

It has been found, in practice, that flexible hose can be inserted in a sharply bent tube quite easily and that if the tube is made to have a close fit to the outer diameter of the hose, as shown in the two examples above described, that although the curvature involved is smaller than that which the hose will normally withstand without collapsing, the hose is held against collapsing by the enclosure tube retaining the hose over its entire diameter.

While the invention has been illustrated with bends equivalent to 90° it is to be understood that the invention can be applied to the maintaining of hose with different angle bends and to the maintaining of compound bends in a flexible hose in the same or in different planes.

Fig. V illustrates an embodiment of the invention suitable for holding flexible hose in sharply bent condition intermediate its ends, without fear of collapsing the hose as it is so held and bent. In this form, the hose is enclosed within a bent tube section formed by two similar sections 34 having externally projecting flanges 36 by which the tube sections are secured together and which flanges incorporate lug portions 38 having holes 40 for the reception of suitable affixing means serving to mount the thus supported hose in a desired location.

In Figs. VI and VII there is shown a one-piece tube section 42 with a substantially right-angle curved bend around which the hose portion 44 is capable of being enclosed in the tube without collapsing, this tube section having its opposite end flared, as indicated at 46, and incorporating a lug 48 with a hole 50 for the reception of suitable mounting means.

Curved tube sections as illustrated in Figs. V to VII are suitable for supporting and maintaining flexible hose with curved bends, including compound bends, in the same or different planes and hold the curved hose bends against collapsing while so supported.

Having thus described my invention what I claim as novel and desire to protect by Letters Patent is:

A hose end fitting for flexible hose, said fitting comprising in combination, an inner nipple and an outer socket defining with said nipple an annular chamber into which an end portion of the hose is capable of being introduced to secure the fitting upon the hose, said socket being formed from tubing having an extension beyond said chamber end defining a curved bend, said socket tube, in its socket forming portion, having left-hand threading rolled thereinto and said nipple having right-hand screw-threading, a collar secured on a portion of said nipple threading at the end of the said chamber remote from its said open end and said curved tube portion, said collar spacing the said socket tube from said nipple, said tube being secured to said collar, said nipple threading extending along a portion of the nipple exposed to said chamber, whereby said socket threading and the said exposed nipple threading are able to co-operate by engagement with the hose surfaces to facilitate the introduction of the hose end portion into said chamber, said curved socket extension being capable of receiving the hose portion immediately adjacent said chamber and holding the said hose portion in corresponding curved shape without collapse.

UNITED STATES PATENTS

References Cited in the file of this patent

| 1,044,013 | Burnett | Nov. 12, 1912 |
| 2,166,448 | Schuknetch et al. | July 18, 1939 |
| 2,171,945 | Norgren | Sept. 5, 1939 |
| 2,288,684 | Couty | July 7, 1942 |
| 2,295,830 | Carlson | Sept. 15, 1942 |

FOREIGN PATENTS

| 21,381 | Great Britain | Oct. 22, 1914 |
| 382,941 | Germany | June 29, 1922 |